United States Patent [19]
Krolopp et al.

[11] 3,796,312
[45] Mar. 12, 1974

[54] AIR BY-PASS PRESSURE SIFTER

[75] Inventors: Otto C. Krolopp; John W. Angstadt, both of Williamsville, N.Y.

[73] Assignee: Blaw-Knox Food and Chemical Equipment, Inc., Buffalo, N.Y.

[22] Filed: May 6, 1971

[21] Appl. No.: 140,718

[52] U.S. Cl..................... 209/312, 209/22, 209/250
[51] Int. Cl............................................... B07b 7/01
[58] Field of Search .......... 209/312, 318, 332, 316, 209/321, 250, 12, 21, 22, 26, 27, 28, 29

[56] References Cited
UNITED STATES PATENTS

| | | | |
|---|---|---|---|
| 589,929 | 9/1897 | Bunce | 209/332 X |
| 671,347 | 4/1901 | Malsness | 209/332 X |
| 687,743 | 12/1901 | Green | 209/332 X |
| 689,258 | 12/1901 | Walter | 209/318 X |
| 2,191,923 | 2/1940 | Cecka | 209/332 X |
| 2,901,109 | 8/1959 | Eddenberger | 209/316 |
| 3,422,955 | 1/1969 | Bock | 209/332 X |
| 468,735 | 2/1892 | Woolcott | 209/29 |

FOREIGN PATENTS OR APPLICATIONS

| | | | |
|---|---|---|---|
| 839,152 | 4/1952 | Germany | 209/316 |
| 854,597 | 1/1940 | France | 209/318 |
| 905,804 | 9/1962 | Great Britain | 209/28 |

*Primary Examiner*—Robert Halper
*Attorney, Agent, or Firm*—Marn & Jangarathis

[57] ABSTRACT

A method and apparatus for increasing the sifting capacity of a pressurized oscillating sifter by directing upwardly a portion of the pressurized air conveying particulate material through a by-pass screen of the same mesh as the sifting screen and into a by-pass channel. The by-pass air is then utilized to entrain the undersize materials which passed through the screen (also called "under," "thrus" and "fines") and convey it to further processing stations. Bed depth on the top screen may be increased by providing a weir at the outlet for oversize material (also called "overs" and "tailings"). Carryover of high-velocity fines into the overs is prevented by providing an impact barrier at the overs outlet on the last screen.

12 Claims, 5 Drawing Figures

PATENTED MAR 12 1974 3,796,312

INVENTORS
Otto C. Krolopp
John W. Angstadt
BY Marn & Jangarathis
ATTORNEYS 3,796,312

AIR BY-PASS PRESSURE SIFTER

BACKGROUND OF THE INVENTION

This invention relates generally to classification apparatus and, more particularly, to machines referred to as rotary pressure screens or rotary pressure sifters. Such machines are widely employed for the size-separation of dry particulate material, and find particular applications in the food, feed and chemical process industries.

Broadly, rotary pressure sifters comprise a pressure vessel divided into upper and lower chambers separated by a screen or screens of desired mesh. The vessel is mounted in such a manner that it can be horizontally oscillated to cause the particles to move across the screen to effect thereby the sifting action. The function of this movement is to transport the oversize particles across the screen to an outlet for these particles. It will be appreciated that the invention is applicable to essentially any type of pressure classification device, without regard to the type of screen motion employed. An inlet in the upper chamber is connected by a flexible coupling to the source of the pneumatically-conveyed particulate material. Generally, a baffle of some sort is provided near the inlet, as regulations governing the sifting of certain foods, for instance, require a true sifting action and prohibit use of the air velocity to literally blow particles through the screen. All of the air passes either through the screen or into the overs discharge outlet. Outlets are also provided with flexible couplings so as to be operable during oscillating movement. Frequently, a plurality of screens are provided, with the overs from the first screen passing downwardly to a second, and so forth. Each screen increases the efficiency of the separation. Alternatively, multiple screens of differing mesh can be employed to produce multiple cuts or classifications, resulting in the production of overs, "middles" and unders. A typical prior art pressure sifter is disclosed in U.S. Pat. No. 3,250,389 of Scruby et al. Generally, all screens slope slightly toward the overs outlet, so that gravity facilitates movement thereover, but this is optional, and flat screens are also used.

Since air must pass through the screen of a conventional pressure sifter, it is necessary that open areas be maintained on the screen at all times. This of course places a limit on the rate at which particulate material can be fed to the machine, i.e., it limits the throughput.

OBJECTS OF THE INVENTION

It is a general object of the present invention to provide an improved pressure sifter and sifting method.

Another object of the present invention is to provide a pressure sifter of significantly greater sifting capacity than prior art sifters of the same general size and type.

A further object of the present invention is to provide means for sifting a deep bed of particulate material, thereby increasing sifting efficiency.

Still another object of the present invention is to provide means for separating air from the particulate material during sifting, whereby sifter capacity is increased.

Various other objects and advantages of the invention will become clear from the following description of embodiments thereof, and the novel features will be particularly pointed out in connection with the appended claims.

BRIEF DESCRIPTION OF DRAWINGS

Reference will hereinafter be made to the accompanying drawings illustrating a preferred embodiment of the invention, and wherein.

DESCRIPTION OF PREFERRED EMBODIMENT

A rotary pressure sifter having top, middle and bottom screens is described. Broadly, the objects of the invention are carried out by providing a by-pass screen of the same mesh as the top screen, located above the top screen. Air entering the inlet chamber of the sifter can pass upwardly through this by-pass screen and may carry some air-borne particulate unders. The chamber above the by-pass screen communicates with a vertical passage into which the unders from all the screens are passed, which in turn communicates with the unders outlet in the bottom portion of the machine. A self-cleaning weir is optionally provided around the overs discharge opening in the top screen, thus increasing bed depth in this area. An air impact barrier is provided on one side of the overs discharge outlet on the bottom screen, to prevent discharge of any high velocity particles therethrough without thorough screening.

Figure 1:
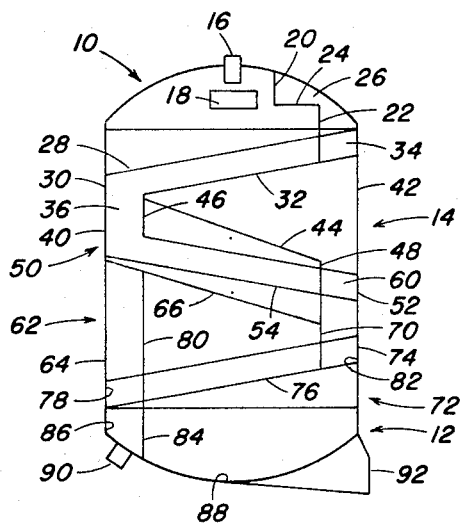
FIG. 1 is a simplified schematic diagram of a sifter employing the invention.
Figure 2:
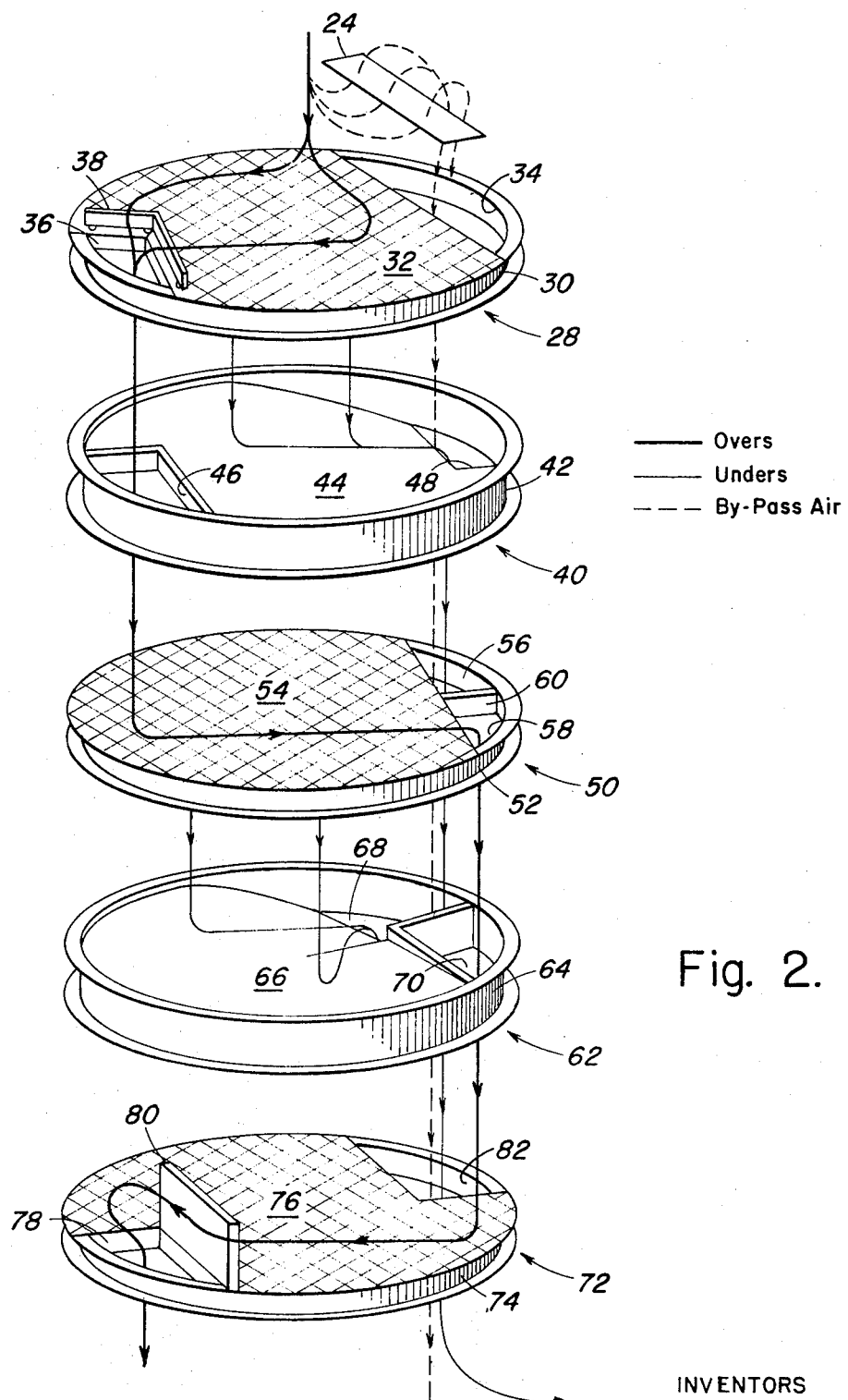
FIG. 2 is an exploded perspective view of the operative parts of the sifter, showing the flow of overs, unders and air.

With reference to FIGS. 1 and 2, the rotary pressure sifter comprises a domed cover 10, a dished bottom 12 and a cylindrical center section 14 therebetween. These three sections are joined by well-known means to form a pressure tight vessel (it is to be noted that pressures employed are low, about 5-15 psig, so heavy construction is not required).

Cover 10 has a centrally located inlet pipe 16 adapted for connection on the outside with a suitable flexible coupling (not shown). An angled baffle 18 located below inlet 16 deflects the incoming particle-bearing air stream in a manner described below in connection with FIG. 3. A vertical wall 20 attached to the underside of cover 10 and a cross member 22 spanning a chord of cover 10 support the horizontal by-pass screen 24 and define the by-pass chamber 26. These are the essential elements of cover 10.

A top screen 28 is located in the top of central section 14 and is comprised of a supporting ring 30, screen 32, a by-pass air passage 34 and an overs discharge opening 36. A weir 38 may be provided around overs discharge opening 36, if desired, to increase bed depth. There should be some clearance under weir 38, however, to allow screen 32 to completely self-clean on shutdown. The lower edge of vertical member 22 in cover 10 adjoins the edge of air passage 34 to form a closed passage for by-pass air around screen 32.

A top tray 40 is located directly below top screen 28, and is comprised of a support ring 52 and tray member 44. The latter element includes a walled opening 46 directly beneath overs discharge opening 36 in tray 28, so as to form a closed vertical passage for overs through tray 40. Tray member 40 is suitably sloped so as to catch unders passing through screen member 32 and direct them by gravity flow to unders discharge opening 48 located directly below by-pass air passage 34 in top screen 28. Discharge opening 48 is only half the size of air passage 34, for reason which will become apparent hereinbelow.

A middle screen 50 is located directly below top tray 40. Middle screen 50 is comprised of a support ring 52, a screen member 54 and a pair of openings 56, 58. Opening 56 is located directly below unders discharge opening 48 in tray member 44, and because of the slope in tray member 44 opening 48 is in the bottom of top tray 40, so opening 56 forms a closed passage for unders past middle screen 50. A vertical member 60 separates openings 56 and 58, which are adjacent each other. Opening 58 forms the overs discharge passage for middle screen 50.

A middle tray 62 is located directly below middle screen 50 and is comprised of a support ring 64, the sloped tray member 66, unders discharge opening 68 and walled overs passage 70. Tray member 66 underlies all of screen member 54, and is sloped so as to guide unders to unders discharge opening 68 which is directly below opening 56 in middle screen 50. Walled overs passage 70 is directly below opening 58 in middle screen 50 and defines a closed passage for overs down past middle tray 62.

A lower screen 72 is located directly below middle tray 62 and is comprised of a support ring 74, a screen member 76, overs discharge opening 78, an impact barrier 80 and an unders passage 82. Unders passage 82 cooperates with unders discharge opening 68 in middle tray 62 in the same manner as openings 48 and 56 cooperate, as described above, to form a closed passage for unders past lower screen 72. Overs discharge opening 78 is diametrically opposite to unders passage 82 and is partially screened by impact barrier 80, which is a vertical wall extending to the underside of middle tray member 66. The function of impact barrier 80 is described hereinbelow in connection with FIG. 4.

The bottom section 12 of the machine (FIG. 1) has an internal divider 84 separating overs passage 86 from unders passage 88. Overs passage 86 is directly below the overs discharge opening 78 in bottom screen 72, and communicates with overs outlet 90. Unders passage 88 underlies lower screen 72 and is in sloping communication with unders outlet 92.

In FIG. 2, a heavy line has been used to trace the course of overs through the sifter, a light line traces the course of unders, and a dotted line traces the by-pass air. Thus, overs move across top screen 32 and drop through passages 36 and 46 and onto middle screen 54; across screen 54 and drop through passages 58 and 70 and onto lower screen 76; across screen 76, around impact barrier 80, down through passage 78 and out of the machine. Passage of overs across screens 32, 54 and 76 is accomplished by gyratory motion and the slight sloping toward the outlets. The unders pass through each of the screens 32, 54 and 76, onto the respective trays 44, 66 and bottom 88, and into the by-pass air passage, where they are entrained by by-pass air. The vertical by-pass air passage is formed by openings 34, 48, 56, 68 and 82.

Figure 3:
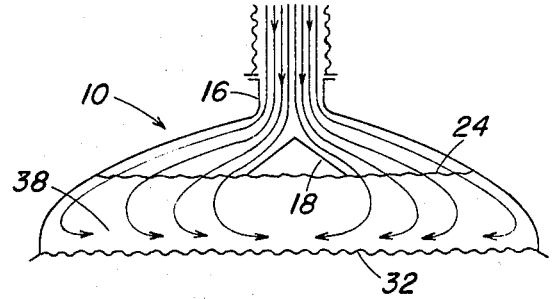
FIG. 3 is a schematic representation of air flow in the vicinity of the inlet.

The effect of angled deflector 18 is graphically illustrated in FIG. 3. As indicated by the arrows, the pneumatically conveyed product stream enters inlet 16 and is deflected toward the periphery in a direction parallel to the long side of overs discharge outlet 36 and also parallel to the long side of air by-pass screen 24. In practice, the velocity of the air is reduced to about 1/64 of the input velocity in this manner. This sudden reduction of velocity allows the product in suspension to slow down rapidly and fall to the surface of top screen 32 below. Impact of particles on the underside of cover 10 also slows particles down and causes them to drop to the screen. These measures minimize the number of unders particles falling directly through overs discharge opening 36 (but of course do not eliminate this). Since the top screen 32 is covered entirely with particles, the path of least resistance for the air is through by-pass screen 24 (the normal gyratory motion of the screen levels particles on all of the screens into an even covering).

Figure 4:
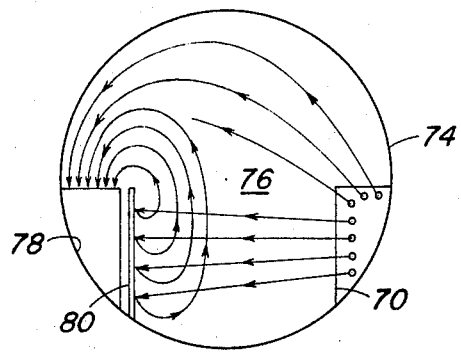
FIG. 4 is a schematic representation of overs flow across the bottom screen, illustrating the effect of the impact barrier.

It is possible that overs particles moving onto bottom screen 72 may have enough residual velocity to move directly across screen member 76 and into final overs outlet 78. To prevent this, impact barrier 80 is provided, and the arrows in FIG. 4 shown how barrier 80 will be in the way of such particles, and cause them to drop to the surface of screen member 76 before reaching outlet 78.

Figure 5:
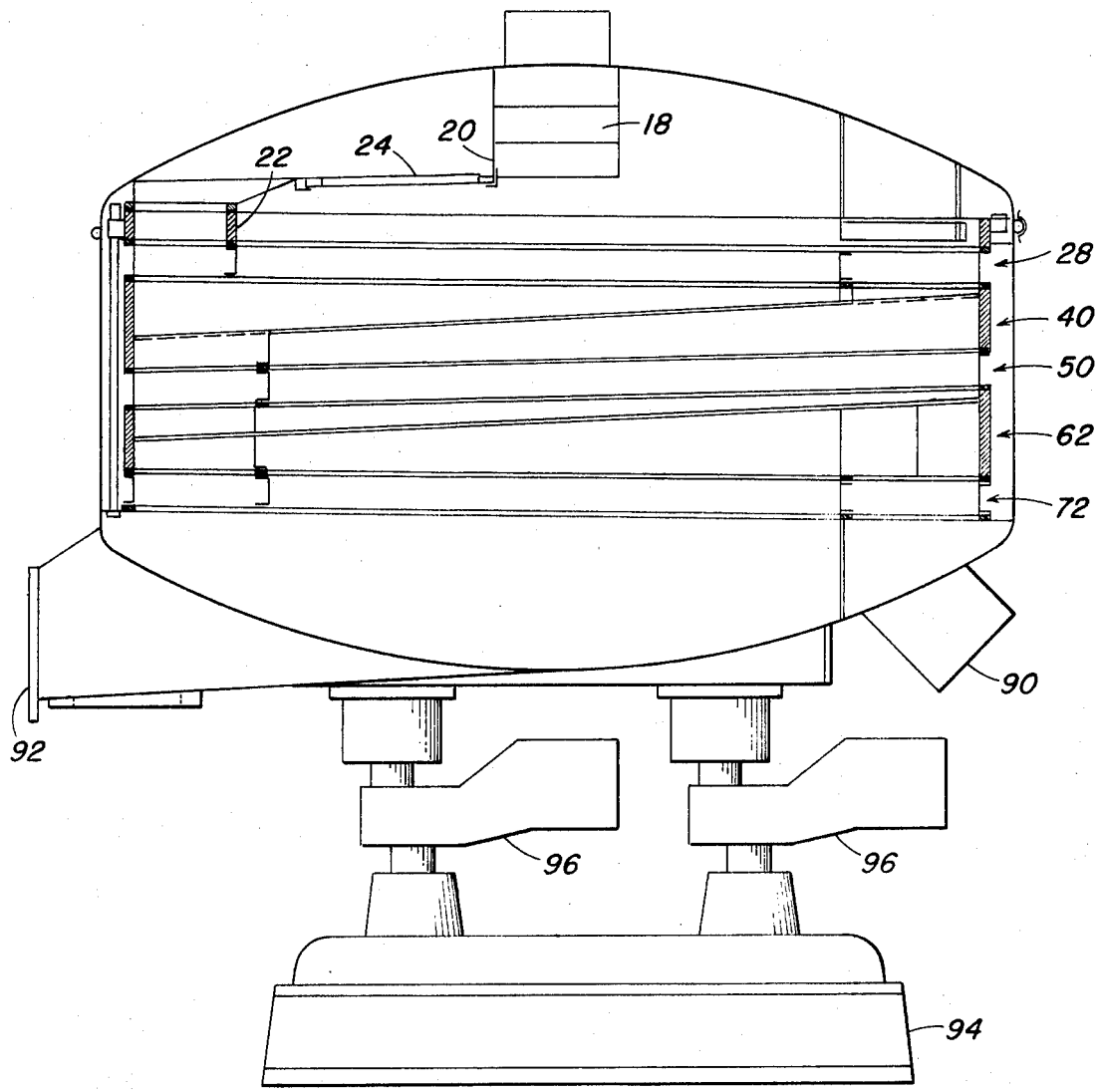
FIG. 5 is a cross-sectional elevation of a preferred embodiment of the invention.

The sloping of the individual screens and trays towards the outlets is shown in very exaggerated form in FIG. 1, and in the correct relation, as actually employed, in FIG. 5. FIG. 5 also includes a machine base 94 and gyratory drives 96 powered by a suitable source (not shown), all of which are entirely conventional and need not be described herein.

In actual tests, a 48 inch rotary pressure sifter equipped with the air by-pass features of the present invention and sifting spring patent wheat flour through a 50 mesh stainless steel B.C. mesh wire, was found to have a capacity of 40,000 pounds per hour. Prior to installation of the air by-pass and other features of the invention, the same unit had a capacity of only 13,000 pounds per hour under similar conditions.

Various changes in the details, steps, materials and arrangements of parts, which have herein been described and illustrated in order to explain the nature of the invention, may be made by those skilled in the art within the principle and scope of the invention as defined in the appended claims. In particular, it will be appreciated that the invention is applicable to single screen sifters, multiple cut sifters, and the like, as well as the embodiment described herein.

What is claimed is:

1. A pressure sifter for size classification of particulate material conveyed by a pneumatic medium comprising:
   a pressure tight chamber having inlet means in the upper portion thereof and at least one outlet means in the lower portion thereof;
   drive means for imparting oscillatory movement to said chamber, in a horizontal plane;
   a sifting screen laterally disposed within said chamber and dividing the upper portion from the lower portion;
   a by-pass conduit means, the inlet to which conduit means being disposed above said sifting screen and in gaseous communication with the lower portion of said chamber beneath said sifting screen and with said outlet means for passing a portion of said pneumatic medium therethrough; and an oversize particle conduit means in particulate communication with the upper surface of said sifting screen and another outlet means.

2. The sifter as defined in claim 1 wherein a screen is disposed in said upper portion of said chamber between said inlet thereto and the inlet to said by-pass conduit means.

3. The sifter as claimed in claim 2 wherein said by-pass conduit means and screen therefor and said sifting screen are of the same mesh.

4. The sifter as claimed in claim 1 and additionally comprising baffle means adjacent said inlet means adapted to deflect particulate material entering said inlet means.

5. The sifter as claimed in claim 1 wherein said sifting screen is sloped downwardly toward said oversize particle conduit.

6. The sifter as claimed in claim 1 and additionally comprising tray means disposed below said sifting screen and sloped downwardly toward said by-pass conduit means.

7. The sifter as claimed in claim 6 and additionally comprising at least one additional sifting screen in said lower portion and below said tray means, the upper surface of each of said additional sifting screens being in particulate communication with said oversize particle conduit, the upper surface of each said additional screen including an opening for passage of oversize particles to a lower screen or the other of said outlet means, and the lower side of each of said additional screens being in fluid communication with said by-pass conduit means.

8. The sifter as claimed in claim 7 wherein the opening in the lowest of said additional screens for passage of oversize particles is partially walled off by a vertical impact barrier.

9. The sifter as claimed in claim 1 wherein said oversize particle conduit means terminates in an opening in the upper surface of said sifting screen and additionally comprises a weir at least partially surrounding said opening.

10. The sifter as claimed in claim 1 wherein said by-pass conduit means is in fluid communication with said outlet means for undersize particles and said oversize particulate conduit is in fluid communication with the other of said outlet means.

11. In the operation of a pressure sifter driven to impart oscillatory movement in a horizontal plane and formed of a pressure tight chamber including a sifting screen wherein a pneumatically conveyed particulate material is introduced into the chamber and dropped onto said screen and wherein a portion of the particulate material is passed through said screen, the improvement comprising: reducing the velocity of the particulate material before dropping it on said screen; withdrawing a major portion of the pneumatic conveying medium from a zone above said sifting screen and passing said major portion through a by-pass conduit to a zone beneath said screen wherein said major portion is utilized to pneumatically re-entrain and withdraw from said sifter said portion of said particulate material.

12. The process as defined in claim 11 wherein said major portion of pneumatic conveying medium is passed through a by-pass screen of the same mesh size as said sifting screen and positioned above said sifting screen prior to passage through said by-pass conduit.

* * * * *